US006744044B2

(12) United States Patent
Hidalgo et al.

(10) Patent No.: US 6,744,044 B2
(45) Date of Patent: Jun. 1, 2004

(54) TIME-OF-FLIGHT MASS SPECTROMETRY UTILIZING A SPLIT MEMORY

(75) Inventors: August Jon Hidalgo, San Francisco, CA (US); Christian A. LeCocq, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/280,476

(22) Filed: Oct. 24, 2002

(65) Prior Publication Data

US 2004/0079877 A1 Apr. 29, 2004

(51) Int. Cl.[7] .................................. G01T 10/00

(52) U.S. Cl. ....................... 250/287; 395/425; 364/200; 711/108

(58) Field of Search ........................... 250/287; 711/108

(56) References Cited

U.S. PATENT DOCUMENTS 4,700,294 A * 10/1987 Haynes ........................ 341/106
5,317,708 A * 5/1994 Edgar .......................... 365/49

* cited by examiner

*Primary Examiner*—John R. Lee
*Assistant Examiner*—James J. Leyboune

(57) ABSTRACT

A spectrometer having a reduced memory size. The spectrometer has an address register, a detector for generating a digital measurement, first and second memories and an adder. The first memory stores data words having a value less than a maximum value, at the register defined address. The adder adds the data value on the data bus to the digital measurement to generate a sum value that is divided into a low order part having a value less or equal to the maximum value and an overflow value. The second memory stores at least a portion of the sum value at a location specified by the register value if the overflow value is greater than zero.

7 Claims, 3 Drawing Sheets

TIME-OF-FLIGHT MASS SPECTROMETRY UTILIZING A SPLIT MEMORY

FIELD OF THE INVENTION

The present invention relates to time-of-flight mass spectrometers.

BACKGROUND OF THE INVENTION

In a time-of-flight mass spectrometer (TOFMS), the sample to be analyzed is ionized, accelerated in a vacuum through a known potential, and then the arrival time of the different ionized components is measured at a detector that is spatially separated from the ion source. The larger the particle, the longer the flight time; the relationship between the flight time and the mass can be written in the form:

$$time = k\sqrt{m} + c,$$

where k is a constant related to flight path and ion energy, c is a small delay time that may be introduced by the signal cable and/or detection electronics.

The detector converts ion impacts into electrons. On average, the signal generated by the detector at any given time is proportional to the number of electrons. There is only a statistical correlation between one ion hitting the detector and the number of electrons generated. In addition, more than one ion at a time may hit the detector.

The mass spectrum generated by the spectrometer is the summed output of the detector as a function of the time-of-flight between the ion source and the detector. The number of electrons leaving the detector in a given time interval is converted to a voltage that is digitized by an analog-to-digital converter (ADC). The dynamic range of the detector output determines the required number of ADC bits.

In general, a short pulse of ions from an ion source is accelerated through a known voltage. Upon leaving the accelerator, the ions are bunched together but travelling at different speeds. The time required for each ion to reach the detector depends on its speed, which in turn, depends on its mass.

A mass spectrum is generated by measuring the output of the ADC as a function of the time after the ions have been accelerated. The range of delay times is divided into discrete "bins". Unfortunately, the statistical accuracy of the spectrum obtained from the ions that are available in a single such pulse is insufficient. Hence, the measurement is repeated a number of times and the individual mass spectra are summed to provide the final result.

There are two basic models for generating the mass spectrum. In the first model, the output from the detector is monitored for a pulse indicative of an ion striking the detector. When such a pulse is detected, the value of the detector output and the time delay associated with the pulse are stored in a memory. Such "event" spectrometers require less memory to store a spectrum since only the peaks are stored.

Unfortunately, this type of system has a number of problems. First, such a system is difficult to implement in a manner that guarantees that there would be no dead time between events and still preserve the cost savings derived from the smaller memory. If an event occurs during such a dead period, the data is lost.

Second, small baseline shifts will cause the system to fail. For example, if the shift causes noise events to be mistaken for peaks, a large percentage of the points will be deemed "events". Such an overload will cause the system to fail unless a fast buffer memory that is comparable in size to that of a summing system is provided.

The second type of spectrometer avoids this discrimination problem by measuring the output of the detector on every clock pulse after the ions have been accelerated and summing the data even if it is likely to be noise. Since no data is discarded, peaks that only appear above the background after a large number of scans are added together are not lost. Unfortunately, this type of spectrometer requires a large high-speed memory for accumulating the spectrum.

The resolution of the spectrometer depends on the number of bins into which the flight time measurements are divided. However, as the number of bins increases, the amount of memory needed to store the spectrum also increases. Each bin is represented by a word in memory. The number of bits needed for each word depends on the maximum count that is expected in the corresponding bin. In general, the spectrum has a number of large peaks on a low-level background. Since the location of these peaks is not known in advance, prior art spectrometers allocate the same number of bits for each word. Hence, a doubling of the time resolution results in a doubling in the size of the spectrum storage memory.

To maximize the sensitivity of a TOFMS experiment, the total data collection time needs to be as short as possible to minimize errors due to instabilities such as drifts in temperature, fluctuations in the high voltage level used to accelerate the ions, and inconsistencies in ion generation. Hence, the time available to sample and record the output of the detector at each time point is quite small. Accordingly, the memory in which the data from each time point is stored must be a very high-speed memory, which increases the cost of the spectrometer.

Broadly, it is the object of the present invention to provide an improved TOFMS.

This and other objects of the present invention will become apparent to those skilled in the art from the following detailed description of the invention and the accompanying drawings.

SUMMARY OF THE INVENTION

The present invention is a spectrometer having a register for storing a register value, a detector for generating a digital measurement in response to a control signal, first and second memories and an adder. The first memory has a plurality of data words, each data word storing a data value that is less than a maximum value, an address input coupled to the register, and a data bus for receiving and transmitting data values. The first memory stores one of the data values in a data word specified by the register value in response to a write command. The first memory also provides the data value corresponding to the register value on the data bus in response to a read command. The adder adds the data value on the data bus to the digital measurement from the detector to generate a sum value that is divided into a low order part having a value less or equal to the maximum value and an overflow value. The second memory stores at least a portion of the sum value at a location specified by the register value if the overflow value is greater than zero. In the preferred embodiment of the present invention, the low order part of the sum value is stored in the first memory at the location specified by the register value. And, the second memory stores the sum of the high overflow values generated for each register value for which the overflow value was greater than zero. The second memory is preferably implemented with a content-addressable memory.

DETAILED DESCRIPTION OF THE PREFERRED EMBODIMENTS OF THE INVENTION

Figure 1:
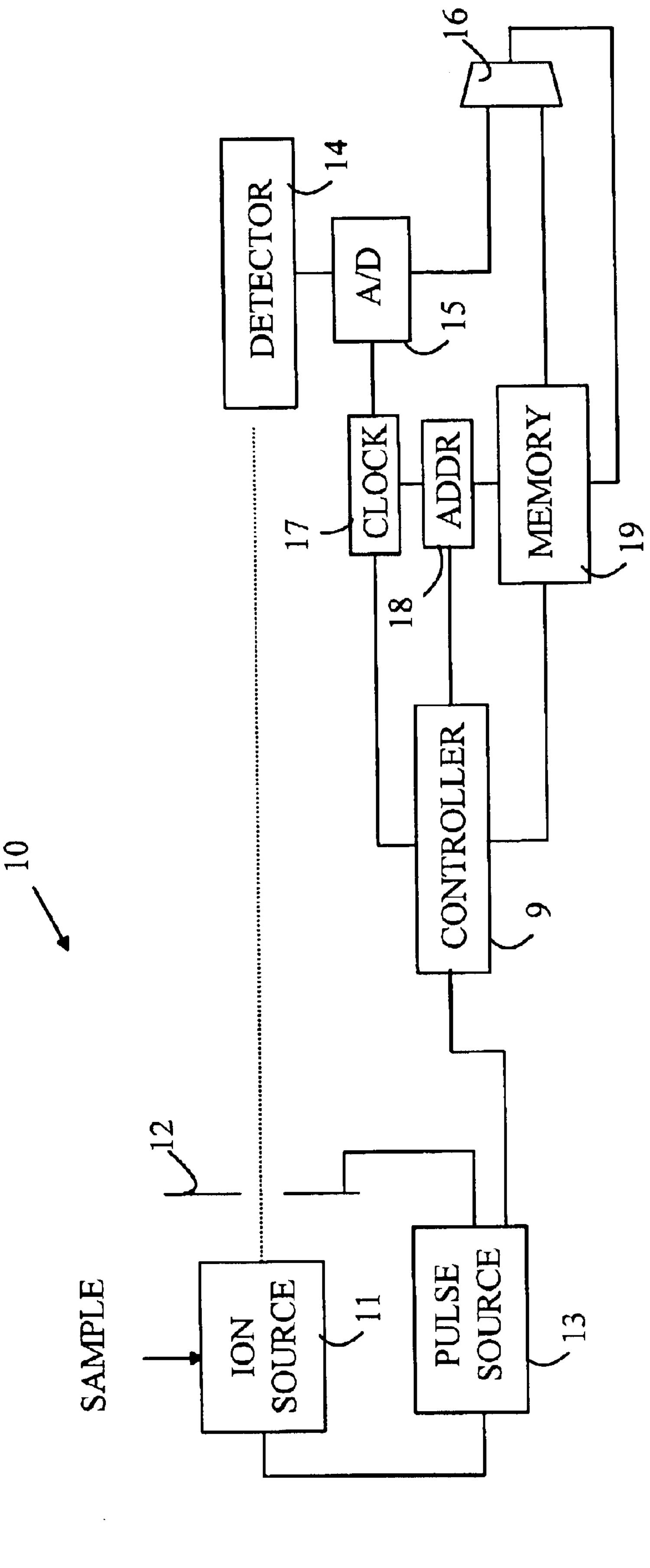
FIGURE 1 (PRIOR ART)
FIG. 1 is schematic drawing of a typical prior art TOFMS.

The manner in which the present invention provides its advantages can be more easily understood with reference to FIG. 1, which is schematic drawing of a typical prior art TOFMS 10. The sample to be analyzed is introduced into an ion source 11 that ionizes the sample. The ions so produced are accelerated by applying a potential between ion source 11 and electrode 12. At the beginning of each mass scan, controller 9 causes a short pulse to be applied between electrode 12 and ion source 11 by sending the appropriate control signal to pulse source 13. Controller 9 also resets the contents of address register 18. On each clock cycle, address register 18 is incremented by clock 17 and the analog-to-digital converter (ADC) shown at 15 digitizes the signal generated by detector 14. The value stored in memory 19 at the address specified in address register 18 are applied to adder 16 which adds the stored value to the value provided by ADC 15. The summed value is then stored back in memory 19 at the address in question.

As noted above, the time required by an ion to traverse the distance between electrode 12 and detector 14 is a measure of the mass of the ion. This time is proportional to the value in address register 18 when the ion strikes the detector. Hence, memory 19 stores a graph of the sum of the detector's output at each time value as a function of the time value.

The signal generated by the detector depends on the number of ions striking the detector during the clock cycle in question. In general ions strike the detector infrequently, and hence, the statistical accuracy of the measurements obtained in any single mass scan is usually insufficient.

To improve the statistical accuracy of the data, the data from a large number of mass scans must be added together to provide a statistically useful result. At the beginning of the measurement process, controller 9 stores zeros in all of the memory locations in memory 19 and initiates the first mass scan. When the first mass scan is completed, controller 9 resets address register 18 and initiates another mass scan by pulsing electrode 12. The data from the second mass scan is then added to that from the previous mass scan. This process is repeated until the desired statistical accuracy is obtained.

Such an averaging process requires the successive mass scans to be completed in a sufficiently short period of time to guarantee that the operating conditions of the instrument have not changed significantly during the measurement process. As noted above, drifts in temperature, fluctuations in the high voltage level used to accelerate the ions, and inconsistencies in ion generation can alter the results. Accordingly, it is advantageous to reduce the time required to make a particular mass scan.

However, any reduction in the scan time must not be made at the expense of the resolution of the instrument. As noted above, the resolution of the TOFMS depends on the number of time points taken in a mass scan. Accordingly, the scan time can only be reduced by increasing the clock speed and shortening the distance between electrode 12 and detector 14. Given the desired mass resolutions, the required clock speeds are of the order of 1 to 4 GHz.

It should be noted that memory 19 must operate at these high clock speeds. In addition, memory 19 must accommodate more than 100,000 locations in a typical TOFMS. The cost of such large high-speed memories is a significant fraction of the cost of the instrument. In addition, the TOFMS market is insufficient to justify custom integrated circuits. Hence, the memory that is available for implementing the device is limited by the amount of memory that is available in commercial gate arrays. Accordingly, it would be advantageous to limit the amount of memory needed to implement a TOFMS.

Figure 2:
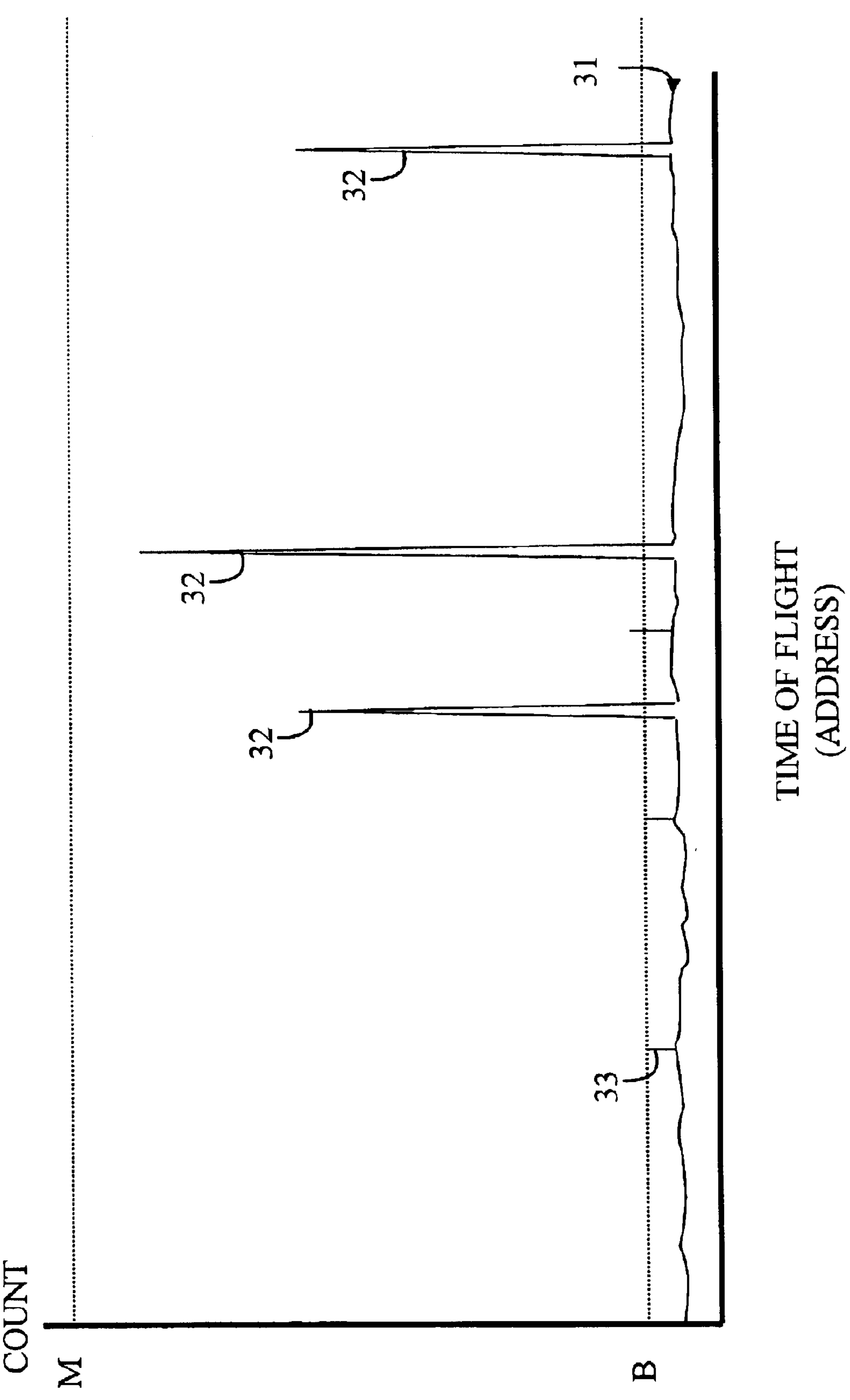
FIG. 2 illustrates a typical mass spectrum generated by a TOFMS.

Refer now to FIG. 2, which illustrates a typical mass spectrum from a TOFMS. The present invention is based on the observation that the typical time-of-flight mass spectrum has a relatively small number of large peaks shown at 32 and 33 on a relatively low background 31. In prior art systems, the amount of memory needed to store the spectrum was determined by the maximum count, M, expected at any memory location. In these systems, the total number of bits required is $N\log_2 M$, where N is the number of bins, i.e., the number of address values, in the memory.

In contrast, the present invention allocates memory for each bin at a level consistent with the maximum count expected in the background regions as shown at B. The peak values that exceed the count that is available in the background memory are then stored in a second memory. Since the number of peaks in the spectrum is small, a substantial savings in overall memory is achieved.

Figure 3:
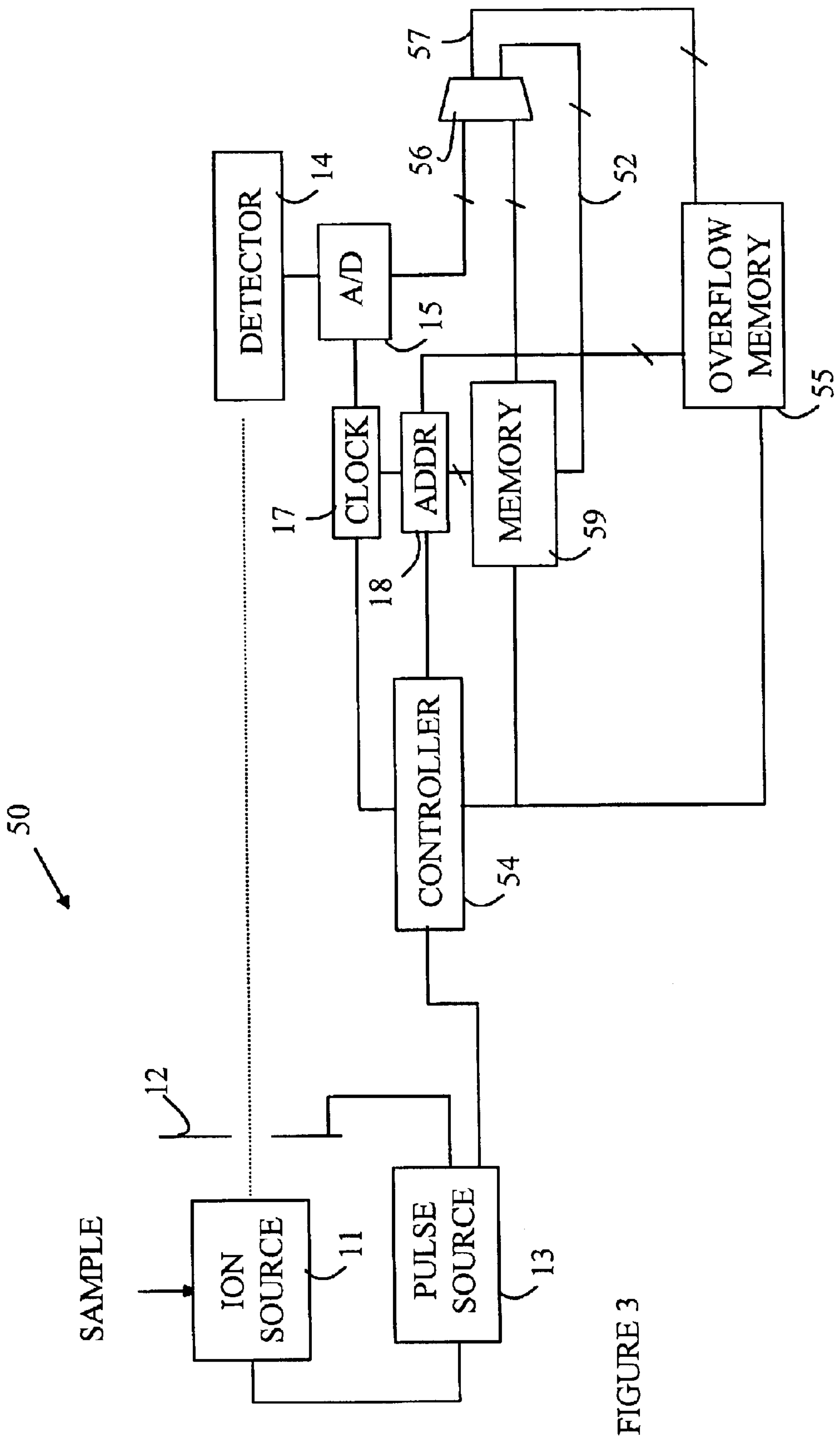
FIG. 3 is a schematic drawing of the preferred embodiment of the present invention.

Refer now to FIG. 3, which is a block diagram of a TOFMS 50 according to one preferred embodiment of the present invention. To simplify the following discussion, those components of TOFMS 50 that provide the same function as the components shown in FIG. 1 have been assigned the same numeric designations and will not be discussed further here. In TOFMS 50 the memory used to store the mass spectrum is divided into a memory 59, which is analogous to a main memory 19 shown in FIG. 1 and an overflow memory 55. The number of bits allocated per word in main memory 59 is between B and M. That is, main memory 59 will hold the part of the mass spectrum corresponding to the background regions and small peaks. However, main memory 59 has insufficient bits per word to store the large peaks. Accordingly, adder 56 will generate an output word that is too large to fit in memory 59 at some point in the data accumulation process. In the preferred embodiment of the present invention, the least significant bits of the sum are stored in main memory 59 and the overflow data is stored in overflow memory 55 as explained below. At the beginning of the measurement process, overflow memory 55 is reset to its empty state along with main memory 59. After the desired number of mass scans has been completed, controller 54 reads out both memories and combines the overflow data with the data for the corresponding addresses in main memory 59.

Overflow memory 55 is preferably organized in a manner analogous to that used in a content-addressable memory (CAM). Overflow memory 55 may be viewed as having a register stack in which each register is divided into an address field and a data field. When overflow memory 55 receives a data value for a given address, overflow memory 55 searches the address fields of all of the registers to determine if any register currently contains the given address in the registers' address field. If such a register is found, the overflow memory increments the contents of the data field by the amount provided on line 57. If no match is found, overflow memory 55 creates a new entry in a free register having the given address and loads the value provided on line 57 into that location. If no free registers are available, overflow memory 55 generates an error condition that can be read by controller 54.

Since the number of peaks in a spectrum is assumed to be small, the size of the overflow memory is also relatively small. Furthermore, the speed of the overflow memory need not be as great as that of main memory 59 provided the store commands to the overflow memory are buffered. Since the address register is incremented at the end of each clock cycle, the same address will not be presented to the overflow memory for at least N cycles. Hence, overflow memory 55 need only complete an update within N clock cycles of receiving the update command. The maximum number of updates per mass scan is relatively small, since the number of large peaks in the mass spectrum is assumed to be small. Hence, the update to memory 55 can be constructed with a buffer and a relatively slow register stack or CAM. However, if overflow memory 55 is to complete each storage operation in one clock cycle, overflow memory 55 can be constructed from a high-speed CAM in which all of the registers are searched in parallel for the desired address.

In the preferred embodiment of the present invention, adder 56 generates a sum that is divided into two sub-words. The lowest significant bits of the sum are provided on a first output bus 52. The most significant bits of the sum are provided on a second output bus 57. The number of bits provided on output bus 52 is preferably equal to the number of bits per word in main memory 59.

In the preferred embodiment of the present invention, the number of bits per word in memory 59 is chosen to match the maximum number of bits per sample generated by ADC 15. In this case, the number of bits on overflow bus 57 will never exceed 1, and a conventional adder can be used implement adder 56 with bus 57 connected to the overflow output of the adder. In addition, the addition logic in overflow memory 55 can be replaced by a simple increment circuit that increments the data field of the selected register by 1.

In the above-described embodiments of the present invention, the data for the peaks was stored jointly in main memory 59 and overflow memory 55. However, other arrangements may be utilized without departing from the teachings of the present invention. For example, when an overflow occurs, the corresponding location in memory 59 can be set to the highest value that can be stored in a memory location and the output of the ADC would then be routed to the overflow memory where it would be used to increment a register in the overflow memory. In this case, the peaks would be stored entirely in the overflow memory. At readout, the controller replaces the data stored in the main memory with the value stored at that address in the overflow memory if the address in question appears in the overflow memory.

The present invention has been explained in terms of a TOFMS. However, the teachings of the present invention can be utilized in any form of spectrum accumulation device in which data characterized by an address register is to be added into a memory such that the contents of the memory are incremented by the data at the address in question.

The above-described embodiments of the present invention utilize a detector that is separate from the ADC. However, the ADC can be incorporated within the detector to provide a detector with a digital output.

Various modifications to the present invention will become apparent to those skilled in the art from the foregoing description and accompanying drawings. Accordingly, the present invention is to be limited solely by the scope of the following claims.

What is claimed is:

1. A spectrometer comprising:

a register for storing a register value;

a detector for generating a digital measurement in response to a control signal;

a first memory having a plurality of data words, each data word storing a value less than a maximum value, an address input coupled to said register, and a data bus for receiving and transmitting a data value, said first memory storing one of said data values in a data word specified by said register value in response to a write command and said first memory providing said data value corresponding to said register value on said data bus in response to a read command;

an adder, responsive to said control signal, for adding said data value on said data bus to said digital measurement to generate a sum value divided into a low order part having a value less or equal to said maximum value and an overflow value; and a second memory for storing at least a portion of said sum value at a location specified by said register value if said overflow value is greater than zero.

2. The spectrometer of claim 1 wherein said low order part of said sum value is stored in said first memory at said location specified by said register value.

3. The spectrometer of claim 1 wherein said second memory stores the sum of said high overflow values generated for each register value for which said overflow value was greater than zero at a location specified by said register value.

4. The spectrometer of claim 1 wherein said second memory comprises a content-addressable memory.

5. The spectrometer of claim 1 further comprising a controller for combining the contents of said first and second memories to provide an output spectrum.

6. The spectrometer of claim 1 wherein said detector comprises a device for generating an electrical signal in response to an ion striking said detector.

7. The spectrometer of claim 6 further comprises an ion source for ionizing a sample to generate said ions and an accelerator for propelling said ions toward said detector.

* * * * *